United States Patent
McGeorge, Jr.

(10) Patent No.: US 6,938,259 B2
(45) Date of Patent: Aug. 30, 2005

(54) API TO ENFORCE INTERNATIONALIZATION

(75) Inventor: Vernon E. McGeorge, Jr., San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 667 days.

(21) Appl. No.: 09/968,553

(22) Filed: Oct. 2, 2001

(65) Prior Publication Data

US 2003/0065825 A1 Apr. 3, 2003

(51) Int. Cl.[7] ............................................. G06F 3/00
(52) U.S. Cl. .................. 719/313; 719/328; 717/124; 704/8
(58) Field of Search ............................. 719/313–315, 719/328; 717/124, 100, 177; 704/8; 715/536; 707/4

(56) References Cited

U.S. PATENT DOCUMENTS

| | | | | |
|---|---|---|---|---|
| 5,434,776 A | * | 7/1995 | Jain ................................ | 704/8 |
| 5,664,206 A | * | 9/1997 | Murow et al. ................... | 704/8 |
| 5,678,039 A | * | 10/1997 | Hinks et al. ..................... | 707/4 |
| 5,900,871 A | | 5/1999 | Atkin et al. .................. | 345/334 |
| 6,182,148 B1 | | 1/2001 | Tout ............................ | 709/245 |
| 6,205,418 B1 | | 3/2001 | Li et al. ......................... | 704/8 |
| 2002/0107684 A1 | * | 8/2002 | Gao .............................. | 704/4 |
| 2002/0165885 A1 | * | 11/2002 | Kumhyr et al. ............. | 707/536 |

OTHER PUBLICATIONS

Piroumian "Internationalization support in Java" 1997 IEEE, pp. 20–29.*
Kokkotos et al. "An architecture for designing internationalized software" 1997 IEEE, pp. 13–21.*

* cited by examiner

*Primary Examiner*—St. John Courtenay, III
*Assistant Examiner*—Van Nguyen

(57) ABSTRACT

A method for enforcing internationalization uses pre-logging subroutines, i.e., helper methods, to determine whether a high priority debug log message is localized, and reject a string message that is not localized in a user's native language. A localized message may be constructed by passing message keys and parameters to a translation subroutine, which is implemented by a localized messaged factory. As a result, only a localized message may be passed to the helper methods, and the localized message is typically translated into a text string in the user's native language before being passed to a raw logging interface to be logged, thus automatically enforcing internationalization.

20 Claims, 3 Drawing Sheets

API TO ENFORCE INTERNATIONALIZATION

CROSS-REFERENCE TO RELATED APPLICATIONS

This patent application is related to U.S. patent application, Ser. No.09/968,552, entitled "API to Increase Debug Log Performance," and filed on the same day herewith.

TECHNICAL FIELD

The technical field relates to computer software systems, and, in particular, to using an application programming interface to enforce internationalization.

BACKGROUND

Software products must be flexible to adapt to the needs of users, and software products developed in one country must be modified and translated to be used by users in other countries. Internationalization is the process of removing language dependencies from software applications, whereas localization is the process of reinserting a specific set of values for the language attributes removed during internationalization.

A logging system is a portion of a larger software application that includes a client program and a logging interface that writes messages, such as errors or warnings, to a log. The logging interface, which accepts strings directly from a programming code, is hereinafter referred to as a raw logging interface. Since a user of a system may be from any country, speaking languages other than English, the messages that are intended for the user (e.g. errors, warnings) mostly need to be displayed in the users' native language, such as French, German, or Chinese. The messages intended only for the development or support of the application may be displayed in the developers language (e.g. English).

Prior logging systems typically expose a raw logging interface to the developers, and rely on developers to properly and completely internationalize log messages. Similarly, traditional application programming interfaces (APIs) depend on the developers to localize the log messages and pass resulting strings to the logging system. If the developers fail in this task, un-localized messages may be logged and passed to the users, hindering localization. These failures can be exceedingly difficult to find and repair during the development process.

SUMMARY

A method for enforcing internationalization includes receiving a message, which includes keys and parameters, from a client program, and passing the keys and parameters to a translation subroutine, which translates the message into a localized message. The method further includes calling a pre-logging subroutine, i.e., helper method, capable of determining whether the message is localized. The pre-logging subroutine typically rejects a non-localized message.

Since each pre-logging subroutine will reject a non-localized message that is logged at a level intended for a user, only localized messages in the user's native language may be passed to the raw logging interface at these levels to be logged, thus automatically enforcing internationalization.

DESCRIPTION OF THE DRAWINGS

The preferred embodiments of a method for enforcing internationalization will be described in detail with reference to the following figures, in which like numerals refer to like elements, and wherein.

DETAILED DESCRIPTION

A method for enforcing internationalization uses pre-logging subroutines, i.e., helper methods, to determine whether a high priority debug log message is localized, and reject a string message that is not localized in a user's native language. A localized message may be constructed by passing message keys and parameters to a translation subroutine, which is implemented by a localized messaged factory. As a result, only a localized message may be passed to the helper methods, and the localized message is typically translated into a text string in the user's native language before being passed to a raw logging interface to be logged, thus automatically enforcing internationalization.

By convention, an original raw logging interface is never called directly by development programmers in a programming code. Because calls to the deprecated raw logging interface can be easily found by any program capable of searching through source files for strings matching these calls, failure to convert to a new logging interface can be trivial to find and repair during the development. In addition, a user can be certain that no old calls remain. Thereafter, any attempt to call the new API with an non-localized message, where a localized message is required, will result in a compilation error.

Figure 1:
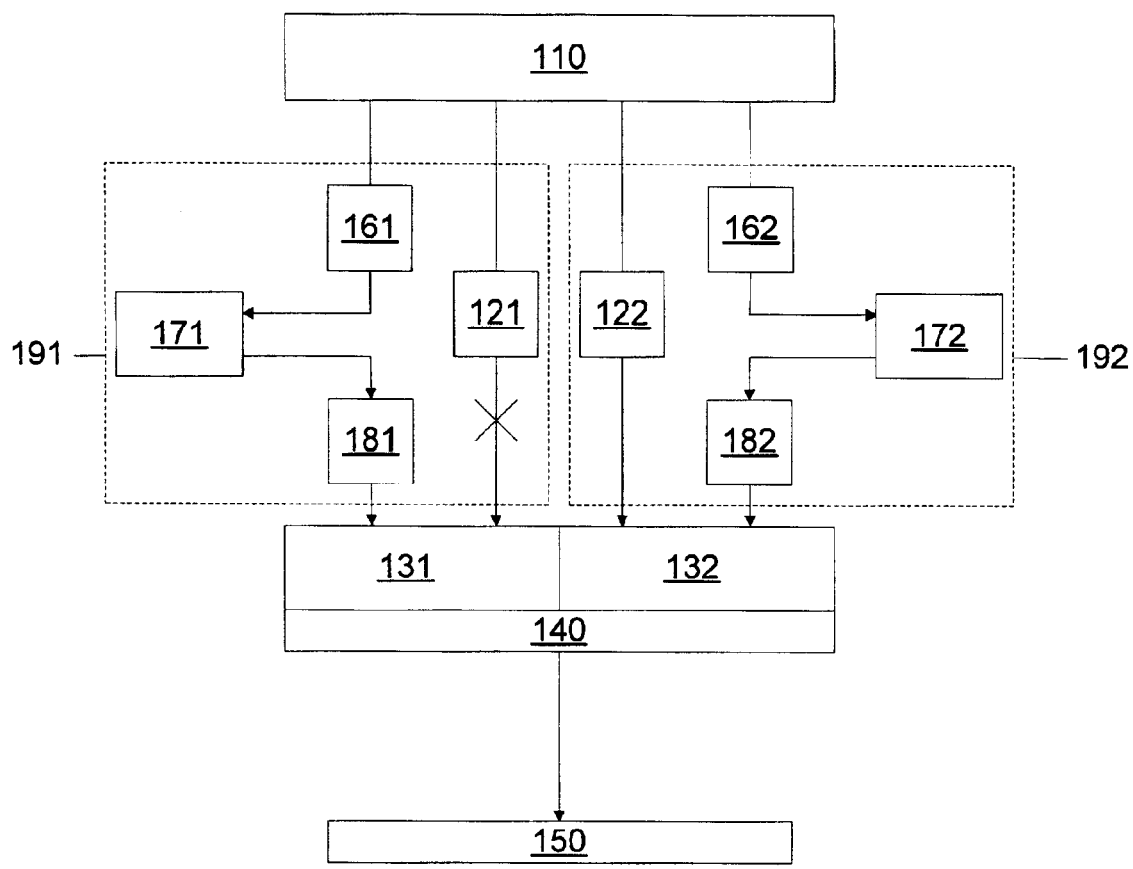
FIG. 1 illustrates an exemplary logging system application programming interface (API)

FIG. 1 illustrates a logging system API that includes a client program 110, a raw logging interface 140, and a log 150. Messages 191, 192 from the client program 110 may be divided into two distinct types: 1) operational logging—low volume, high priority messages 191 that must be logged during normal operation in a localized manner; and 2) debug logging—high volume, low priority messages 192 that may be logged only as requested by a developer. The raw logging interface 140 that writes a message 191, 192 to the log 150 at a specific logging level may not be implemented as a public interface and may not be accessible by users working on the client program 110. The public interface that is exposed to the users may be defined as a set of helper methods, such as helper methods 131 for operational logging and helper methods 132 for debug logging.

The helper methods 131 for operational logging serve as a public interface accessible by users working on a client program 110. The helper methods 131 typically process operational log messages 191 intended for helping the users to operate the client program 110, such as warning information concerning a potential problem or an error indicating the failure of a certain function. Since the user may be from any country, speaking languages other than English, sending a message of this type in English is not particularly helpful. Accordingly, such messages 191 need to be displayed in the users' native language, such as French, German, or Chinese. However, the helper methods 132 for debug logging typically process debug log messages 192 that consume more time and memory resources. Intended for the developers, these type of messages 192 may be received in the developer's native language, which is typically English. The helper methods 132 for debug logging are described in detail in the related U.S. patent application, entitled "API to Increase Debug Log Performance," filed on the same day herewith, which is incorporated herein by reference.

Method signatures of the helper methods 131 for the operational log messages 191 typically require a localized message 181 as input and reject a non-localized string message 121. Method signatures of the helper methods 132 for the debug log messages 192 typically accept either a localized message 182 or a non-localized message 122, which is typically a simple text string. A method signature is a formal definition of calls to a method (or subroutine) that includes the name of the method and the number and types of parameters that may be passed to the method. In modern (and particularly object oriented) computer languages, the method signature is used to select which version of a method will be called when multiple versions (i.e., methods with the same method name but different parameters) of a method exist. The localized messages 181, 182, i.e., messages in a user or developer's native language, are typically constructed by translation subroutines after receiving message keys and parameters 161, 162 from the client program 110. The translation subroutines may be implemented by localized message factories 171, 172.

To construct an operational log message 191, the client program 110 typically passes keys and parameters 161 to be included in a message 191 to the localized message factory 171, which translates the message 191 to a localized message 181. The translation may be accomplished by selecting a version of a message catalog particular to the user's native language, using locale information from an environment variable. An original version of the message catalog may be developed by development engineers, by creating a message template in the developer's native language, for example, English. Subsequent versions of the message catalog may be produced by localization engineers, by translating the message template in the developer's native language to a message template in the user's native language. The message template typically contains placeholders for any parameters to be included in the message 191. Once the message template in the user's native language is retrieved, the localized message 181 may be produced by capturing the message keys and parameters 161 in an instance of an object that is of a particular localized message class. Then, the helper method 131 may be called to log the operational log message 191 that is user readable.

Since the helper methods 131 for operational logging only accept localized messages 181 and reject string messages 121, i.e., non-localized messages, the helper methods 131 may prevent logging of operational log messages 191 that are not localized in the users' native language. In other words, only a localized message 181 in the users' native language may be passed from the helper methods 131 to the raw logging interface 140 to be logged, thus automatically enforcing internationalization.

Methods for localizing a message or providing multiple language capability for computer applications are described, for example, in U.S. Pat. No. 6,205,418, issued on Mar. 20, 2001 to Li et al., entitled "System and Method for Providing Multiple Language Capability in Computer-Based Applications," which is incorporated herein by reference. Li et al. disclose a system and method capable of dynamically changing language selections for text-based information that is visually presented to a user of a target application. The target application includes commands, labels, status and error messages, help screens, and the like. Users can either select a pre-programmed standard language, customize any of the standard languages to create a modified version of the standard language, or create a new language.

Figure 2:
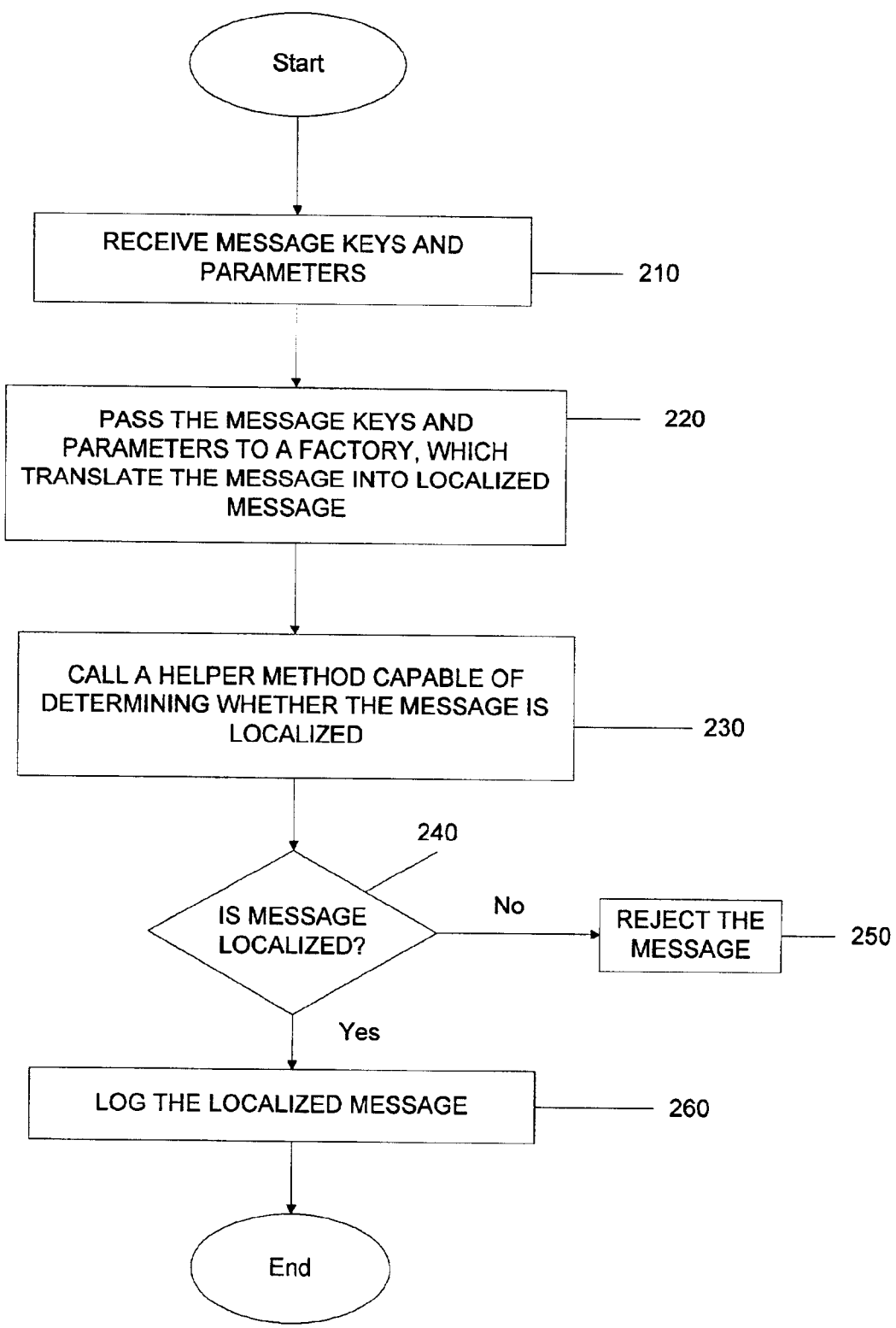
FIG. 2 is a flow chart illustrating an exemplary method for enforcing internationalization.

FIG. 2 is a flow chart illustrating an exemplary method for enforcing internationalization. First, in order to log a message 191 to the user, the message 191 must be at a particular high priority level, such as fatal, error, or warning messages. After receiving keys and parameters 161 of the operational log message 191, step 210, the client program 110 typically passes the message keys and parameters 161 to a localized message factory 171, which translates the message 191 into a localized message 181, step 220. A message template may need to be created for the message keys and parameters 161 in the developer's native language, (e.g. English). A localization engineer may need to translate the message template in English to a message catalog in the user's native language.

After the localized messages 181 is created, the client program 110 typically calls the helper methods 131 for operational logging capable of determining whether the message 191 is localized, step 230. If the message 191 is not localized, step 240, the message 191 may be rejected by the helper methods 131, step 250. Accordingly, only the localized message 181 in the user's native language may be logged, step 260, automatically enforcing internationalization.

Figure 3:
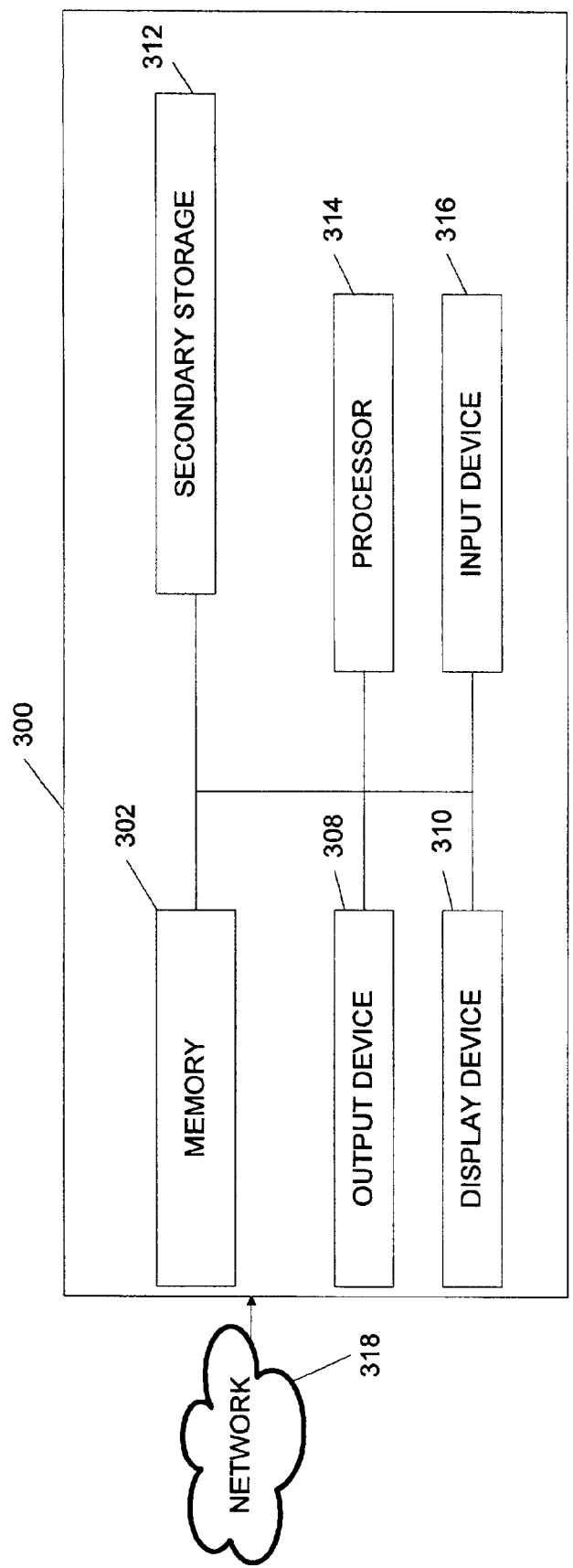
FIG. 3 illustrates exemplary hardware components of a computer that may be used in connection with the exemplary method for enforcing internationalization of FIG. 2.

FIG. 3 illustrates exemplary hardware components of a computer 300 that may be used in connection with the exemplary method for enforcing internationalization. The computer 300 includes a connection with a network 318 such as the Internet or other type of computer or telephone networks. The computer 300 typically includes a memory 302, a secondary storage device 312, a processor 314, an input device 316, a display device 310, and an output device 308.

The memory 302 may include random access memory (RAM) or similar types of memory. The secondary storage device 312 may include a hard disk drive, floppy disk drive, CD-ROM drive, or other types of non-volatile data storage, and may correspond with various databases or other resources. The processor 314 may execute information stored in the memory 302, the secondary storage 312, or received from the Internet or other network 318. The input device 316 may include any device for entering data into the computer 300, such as a keyboard, keypad, cursor-control device, touch-screen (possibly with a stylus), or microphone. The display device 310 may include any type of device for presenting visual image, such as, for example, a computer monitor, flat-screen display, or display panel. The output device 308 may include any type of device for presenting data in hard copy format, such as a printer, and other types of output devices including speakers or any device for providing data in audio form. The computer 300 can possibly include multiple input devices, output devices, and display devices.

Although the computer 300 is depicted with various components, one skilled in the art will appreciate that the computer 300 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 300 to perform a particular method.

While the method and apparatus for enforcing internationalization have been described in connection with an exemplary embodiment, those skilled in the art will understand that many modifications in light of these teachings are possible, and this application is intended to cover any variations thereof.

What is claimed is:

1. A computer-implemented method for enforcing internationalization, comprising:

receiving a message from a client program wherein the message includes keys and parameters;

passing the keys and parameters to a translation subroutine, wherein the translation subroutine translates the message into a localized message;

calling a pre-logging subroutine, wherein the pre-logging subroutine is capable of determining whether the message is localized, and wherein the pre-logging subroutine rejects a non-localized message;

only passing a localized message in a user's native language from the pre-logging subroutine to a raw logging ace to be logged; and wherein the raw logging interface cannot be implemented as a public interface and cannot be accessible by users working on the client program.

2. The computer-implemented method of claim 1, wherein the passing step includes creating a message template foil the keys and parameters in a developer's native language.

3. The computer-implemented method of claim 2, wherein the passing step further includes translating the message template in the developer's native language into a message template in a user's native language.

4. The computer-implemented method of claim 1, further comprising logging the localized message.

5. The computer-implemented method of claim 1, wherein the calling step includes calling a helper method for operational logging.

6. The computer-implemented method of claim 1, wherein the calling step includes calling a helper method that processes operational log messages.

7. The computer-implemented method of claim 1, wherein the passing step includes translating the message into a user's native language by a localized message factory.

8. A logging system application programming interface (API) executing on a computer system, comprising:

one or more translation subroutine that receives keys and parameters of a message, wherein the one or more translation subroutine translates the message into a localized message;

one or more pre-logging subroutines capable of determining whether the message is a localized message, wherein the one or more pre-logging subroutines rejects a non-localized message, and wherein the one or more pre-logging subroutines only pass a localized message in a user's native language to a raw logging interface to be logged;

the raw logging interface that writes the message to a log; and wherein the raw logging interface cannot be implemented as a public interface and cannot be accessible by users working on the client program.

9. The logging system API of claim 8, wherein if the message is localized, the one or more pre-logging subroutines pass strings of the localized message to the raw logging interface to be logged.

10. The logging system API of claim 8, wherein the one or more translation subroutine creates a message template for the key and parameters.

11. The logging system API of claim 8, wherein the one or more pre-logging subroutines are helper methods for operational logging.

12. The logging system API of claim 8, wherein the one or more pre-logging subroutines process operational log messages.

13. The logging system API of claim 8, wherein the translation subroutine is implemented by a localized message factory.

14. A tangible computer readable medium providing instructions for enforcing internationalization, the instructions comprising:

receiving a message from a client program, wherein the message includes keys and parameters;

passing the keys and parameters to a translation subroutine, wherein the translation subroutine translates the message into a localized message;

calling a pre-logging subroutine, wherein the pre-logging subroutine is capable of determining whether the message is localized, and wherein the pre-logging subroutine rejects a non-localized messages;

only passing a localized message in a user's native language from the pre-logging subroutine to a raw logging interface to be logged; and wherein the raw logging interface cannot be implemented as a public interface and cannot be accessible by users working on the client program.

15. The tangible computer readable medium of claim 14, wherein the instructions for passing include instructions for creating a message template for the keys and parameters in a developer's native language.

16. The tangible computer readable medium of claim 15, wherein the instructions for passing further include instructions for translating the message template in the developer's native language into a message template in a user's native language.

17. The tangible computer readable medium of claim 14, further comprising instructions for logging the localized message.

18. The tangible computer readable medium of claim 14, wherein the instructions for calling include instructions for calling a helper method for operational logging.

19. The tangible computer readable medium of claim 14, wherein the instructions for calling include instructions for calling a helper method that processes operational log messages.

20. The tangible computer readable medium of claim 14, wherein the instructions for passing include instructions for translating the message into a user's native language by a localized message factory.

* * * * *